E. P. H. Capron.
Land Roller.
No. 85,641.    Patented Jan. 5, 1869.
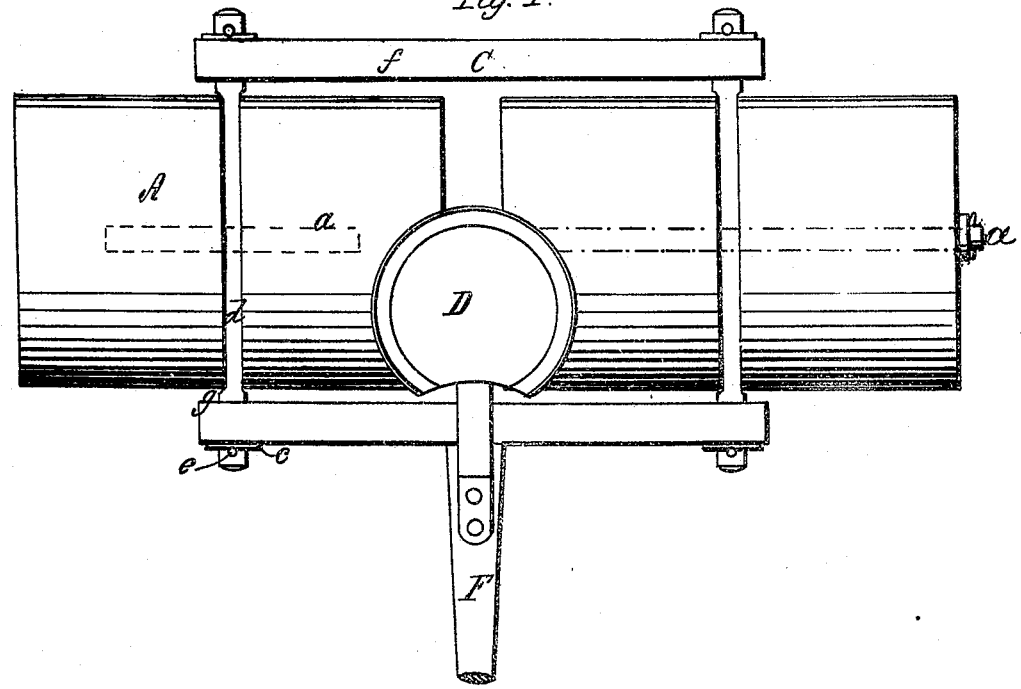
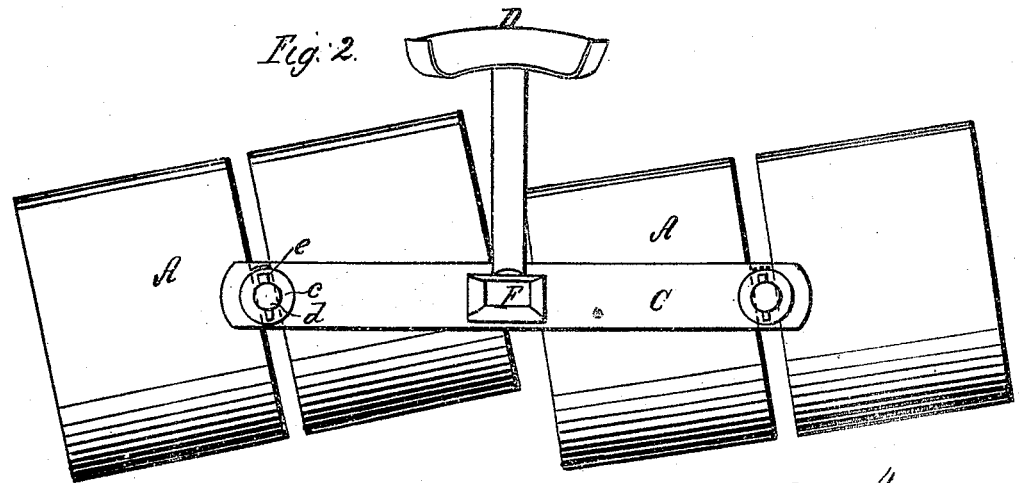
Witnesses:
L. Hailer.
P. T. Dodge.
Inventor:
E. P. H. Capron
by Dodge & Munn
his attys

United States Patent Office.

E. P. H. CAPRON, OF SPRINGFIELD, OHIO.

*Letters Patent No. 85,641, dated January 5, 1869.*

IMPROVEMENT IN LAND-ROLLERS.

The Schedule referred to in these Letters Patent and making part of the same.

*To all whom it may concern:*

Be it known that I, E. P. H. CAPRON, of Springfield, in the county of Clark, and State of Ohio, have invented certain new and useful Improvements in Field-Rollers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to field-rollers, and consists in connecting them, in pairs, to a frame, in such manner that each pair may adjust itself to the uneven surfaces of the ground, without materially interfering with the motions of the other.

In the drawings—

Figure 1 is a top plan view, and

Figure 2, a front view of my field-rollers.

I construct a frame, C, consisting of the front and rear beams, *f*, connected by the cross-pieces *d*, of any size desired. The ends of the cross-pieces *d*, I make so as to form journals, with a shoulder, *g*, on their inner side, to allow them to pass through the beams *f* far enough to receive a washer, *c*, and pin, *e*, as shown in fig. 1. In this way I make the cross-pieces *d* serve as part of the frame, and at the same time to turn freely in the beams *f*, and on each one of these cross-pieces I mount a pair of rollers, A, of any desired size and material, by passing a strong bolt, *a*, or rod through their centres, midway between their ends, and at right angles to their length, so as to move or turn freely therein, and connecting it to the rollers.

The bolt *a* may be rigidly connected to the rollers, or it may be passed entirely through them, and receive a pin or key on its outer ends, as shown in red lines, fig. 1.

To the front of the frame C, I attach the tongue F, and near their point of connection mount a spring-seat, D, as clearly shown in fig. 1.

My rollers, when thus constructed, can be conveniently drawn, by suitable animals, in any direction about the field, and as each pair is mounted on a shaft independent of that on which the other is mounted, they will each adjust themselves to the uneven surfaces of the ground, independent of the other, as clearly shown in fig. 2, and should one of them come in contact with a stump, or strike a stone, it will move over it, without materially affecting the work of the other.

If it is desired to have the rollers forming each pair close to each other, or with some little space intervening, it is obvious that the cross-pieces *d* and bolts *a* may be readily arranged for the purpose.

Having thus described my invention,

What I claim, is—

A field-roller, consisting of the rollers A, connected together in pairs by a bolt, *a*, passing through and turning loosely in the cross-pieces *d*, all constructed and arranged to operate substantially as herein described, and for the purpose set forth.

E. P. H. CAPRON.

Witnesses:
J. K. MOWER,
GEORGE C. RAWLINS.